(12) United States Patent
Fredrick

(10) Patent No.: US 8,225,920 B1
(45) Date of Patent: Jul. 24, 2012

(54) HYDRAULIC CLUTCH MASTER CYLINDER FIREWALL MOUNTING ADAPTOR

(76) Inventor: Gray G. Fredrick, Cookeville, TN (US)

( * ) Notice: Subject to any disclaimer, the term of this patent is extended or adjusted under 35 U.S.C. 154(b) by 480 days.

(21) Appl. No.: 12/387,693

(22) Filed: May 6, 2009

(51) Int. Cl.
*F16D 23/12* (2006.01)
(52) U.S. Cl. ........................ 192/85.6; 192/115; 192/99 S
(58) Field of Classification Search ............... 192/85.6, 192/85.55, 115, 99 S
See application file for complete search history.

(56) References Cited

U.S. PATENT DOCUMENTS

| | | | | |
|---|---|---|---|---|
| 4,516,748 A | * | 5/1985 | Nix et al. ....................... | 248/694 |
| 4,779,713 A | * | 10/1988 | Tomala et al. ............. | 192/85.15 |
| 6,095,306 A | * | 8/2000 | Hu et al. ..................... | 192/109 F |
| 6,443,288 B1 | * | 9/2002 | Pinto ............................. | 192/99 S |

* cited by examiner

*Primary Examiner* — David D Le
*Assistant Examiner* — Jacob S Scott
(74) *Attorney, Agent, or Firm* — John F. Bryan

(57) ABSTRACT

Installing of an SAE standard hydraulic clutch master cylinder, with a threaded push-rod, on an automobile firewall and operable by a pivotally mounted pedal/pedal arm assembly has a cylinder bracket with SAE standard cylinder mounting provisions and also provides a pivotal connection axis perpendicular to the cylinder axis for mounting the cylinder to a reinforcing plate which bolts to the firewall. The cylinder bracket pivots on a horizontal axis and is clamped in position with the push-rod extending to connect to the pedal so that it is aligned with the cylinder axis. The push-rod has a stop which limits fluid displacement by the master cylinder.

20 Claims, 2 Drawing Sheets

HYDRAULIC CLUTCH MASTER CYLINDER FIREWALL MOUNTING ADAPTOR

TECHNICAL FIELD

The present invention relates generally to the field of automobile clutch mechanisms and more particularly, to aftermarket engine and transmission modifications, wherein a manual transmission is installed in place of an automatic or a mechanical clutch release mechanism is converted to hydraulic actuation.

BACKGROUND

Automobile enthusiasts often make extensive modifications to their cars to enhance performance. Such modifications may often involve replacing the engine and transmission for greater speed and acceleration or simply modifying the existing equipment with custom cams, exhaust headers, intake manifolds and perhaps superchargers. This quest for power is intrinsic to the scene of our American car culture. It is fueled by drag strip competition to some extent, stop light machismo to some extent and a personal need to give one's car some "special" identity. Whatever the motivation, many of the cars given such treatment will have automatic transmissions or mechanical clutch release mechanisms as original equipment.

An automatic transmission is not acceptable to many enthusiasts, who object to inappropriate speed ratio selections and the power losses inherent to automatics. Installation of a clutch pedal from salvage or reproduction parts sources is not a difficult task for any skilled mechanic.

A mechanical linkage is serviceable enough for the average driver, but many enthusiasts prefer a hydraulic clutch release system for more precise control and better feel. Non-standard engine, transmission and exhaust installations may also introduce other clearance issues. For these reasons, mechanical clutch release mechanisms are routinely discarded in favor of hydraulic actuators as part of the overall changes.

In converting a car to use a hydraulic clutch release system, the hydraulic clutch master cylinder is preferably mounted to the sheet metal of the firewall, on the engine side, opposite the clutch pedal, where it can be operated by the newly installed or existing pedal arm for actuation. The firewall sheet metal is generally vertical or somewhat inclined and is also relatively thin, so that some form of reinforcement is required to support and stabilize the master cylinder under operating forces. Pedal arm angle, its pivot axis location and the desired mechanical advantage for pedal force, combine to establish the line-of-action angle of the master cylinder push-rod. These factors may differ in every car, even in cars of the same model.

Clutch master cylinders vary in both bore diameter and stroke length, but are all made to conform to SAE (Society of Automotive Engineers) standard mounting dimensions as to the two bolt pattern and pilot diameter. Thus, an aluminum block, bolted to the firewall and machined to provide the standard SAE mounting, has become the commonly accepted cylinder installation adaptor. Should the push-rod line-of-action be misaligned when connected to the clutch pedal arm, a tapered shim is placed between the firewall sheet metal and the aluminum block. If even greater angular adjustment is required, the firewall face of the block may be machined to achieve the desired alignment. If not properly aligned, the bore, seals and piston will wear prematurely or the cylinder may be inoperable.

Master cylinder stroke length is also an issue in such an installation. There must be sufficient slave cylinder travel for positive clutch release action, yet overtravel is most undesirable. In order to limit the master cylinder output volume to only that needed by the slave cylinder, master cylinder stroke is usually limited by stopping pedal arm travel with a blocking piece placed under the clutch pedal, the thickness being adjusted by trial and error.

SUMMARY OF THE INVENTION

The present invention provides a universal master cylinder mounting apparatus, working to facilitate the three necessary installation functions of: firstly, stabilizing the firewall sheet metal; secondly, adjusting the cylinder push-rod line-of-action; and thirdly, positioning a cylinder stroke limiting stop. A preferred embodiment of the present invention comprises an assembly, each part of which cooperates with the others in accomplishing these functions.

When converting from an automatic transmission, a new clutch pedal assembly is installed. When converting from a mechanically actuated clutch release arrangement, the linkage parts are removed and the swinging pedal arm and pedal may be left in place. The threaded push-rod of the hydraulic master cylinder is next pivotally connected to the pedal arm where the mechanical linkage would normally be connected. If a firewall opening for the mechanical linkage is not present, a new opening is made in the firewall sheet metal so the push-rod will pass through. The opening is located on a line tangent to the pedal arm connection arc-of-motion, which is referred to hereinafter as the "line-of-action".

The first functional component of the adaptor is a firewall reinforcing plate, with an opening to pass the cylinder push-rod and bolt holes for attachment to the driver's side of the firewall, where it is centered on the line-of-action. The second functional component is a "U" shaped bracket matching the reinforcing plate so that they can be bolted together, clamping the firewall in-between to afford the necessary reinforcement. Symmetrical members extend at each side of the opening, making the "U" shape and providing for connection of the similarly configured third component.

The third functional component is a "U" shaped bracket with arms extending on each side. The base of this bracket has the SAE standard pilot diameter and bolt pattern for mounting a hydraulic clutch master cylinder and the arms are configured for pivotally adjustable connection to the symmetrical arms of the second component This connection is locked in a selected position, adjusted to an angle about a horizontal axis that best aligns the master cylinder with the line-of-action. Means for locking the connection at the selected angle are well known in the mechanical arts and may be in the form of a locking bolt in an arcuate slot or locking washers on the bolted pivotal connection.

The slave cylinder may be mounted external to the clutch housing and actuate the same clutch release arm as did the mechanical linkage, or a commercially available slave cylinder mounted concentric to the transmission input shaft may be used. In either case, the installation is completed with the conventional hydraulic fluid reservoir and fluid line connections. Lastly, the master cylinder output volume is limited to that required for the appropriate slave cylinder stroke by locking a pair of jam nuts on the threaded push-rod, as a stop to bear against the firewall reinforcing plate at the periphery of the opening and thereby, limit the master cylinder stroke.

DETAILED DESCRIPTION OF THE DRAWINGS

Figure 1:
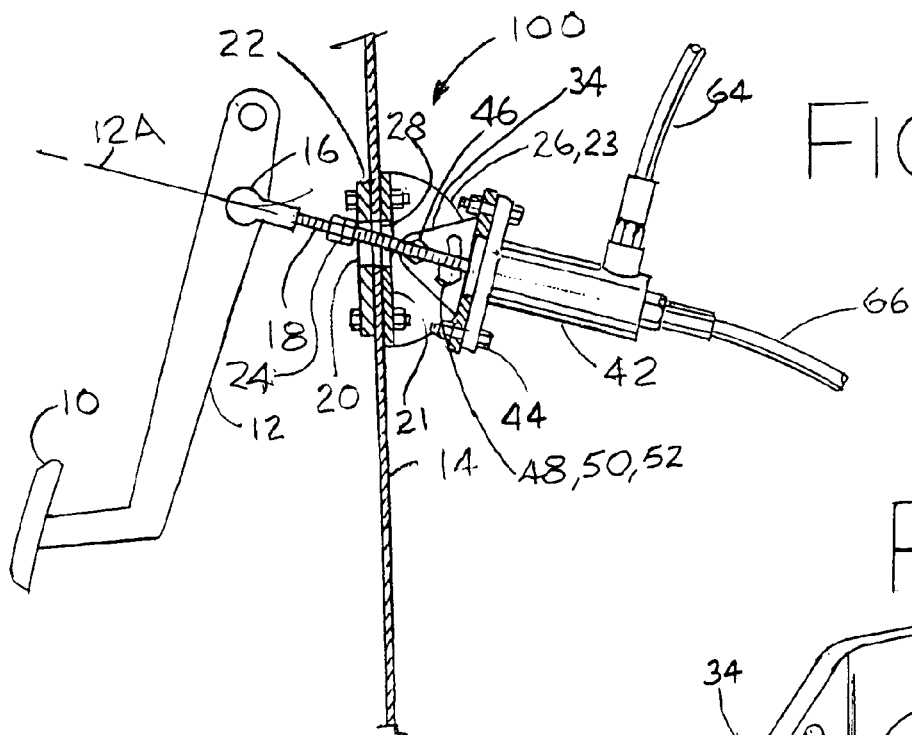
FIG. 1 is a section view of an installation of a preferred embodiment of the adaptor of the present inventions.
Figure 2:
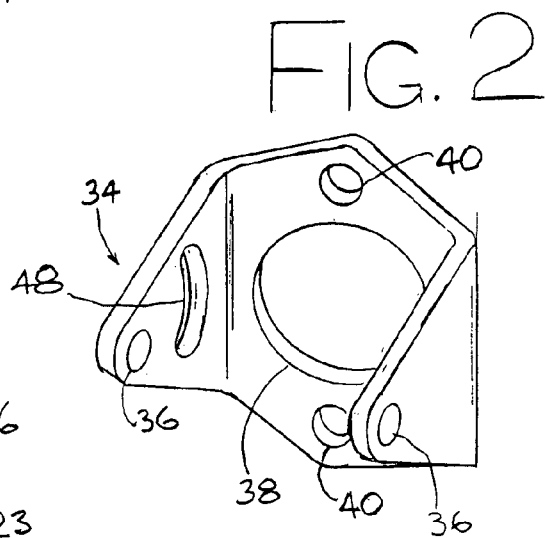
FIG. 2 is a view of the bracket of the adaptor of FIG. 1.
Figure 3:
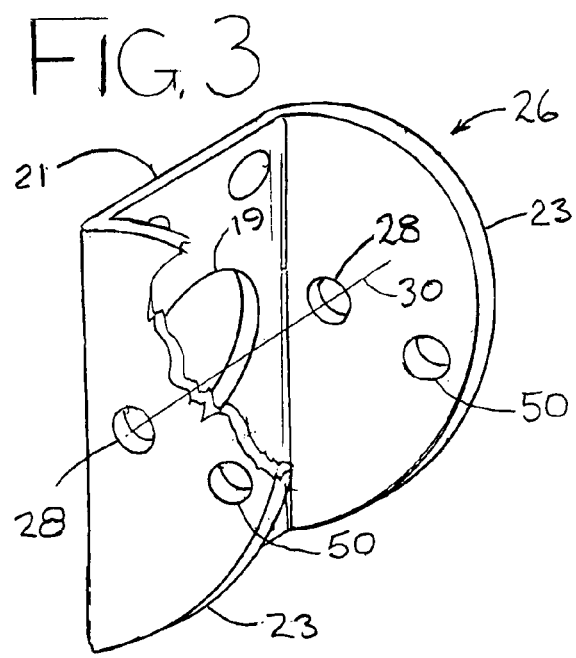
FIG. 3 is a view of the cylinder bracket of the adaptor of FIG. 1.
Figure 4:
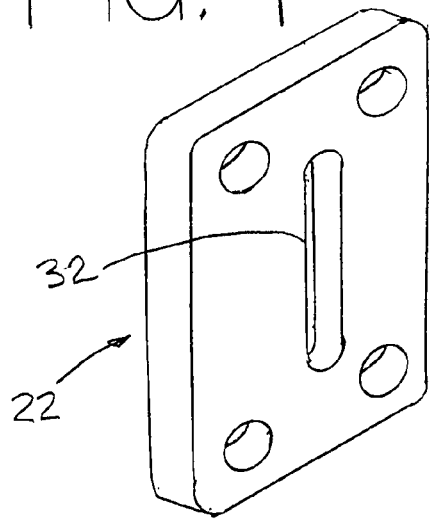
FIG. 4 is a view of the reinforcing plate of the adaptor of FIG. 1.

The present invention is described in the following by referring to drawings of examples of how the invention can be made and used. In these drawings, reference characters are used throughout the views to indicate corresponding parts. The embodiment shown and described herein is exemplary. Many details are well known in the art, and as such may be neither shown nor described.

FIGS. 1-4 show preferred embodiment 100 of the present invention as it appears in a typical installation. The clutch pedal 10/pedal arm 12 assembly is shown to be already in place, as part of a mechanical clutch system being converted to hydraulic actuation. When an automatic transmission is being replaced by a manually shifted transmission, parts for the pedal and pedal arm assembly are readily available from new or used sources and installation is readily accomplished by any experienced mechanic. Virtually all automobile bodies are configured to accept either a manual or an automatic transmission.

Pedal arm 12 is mounted for pivotal movement in relation to firewall 14 and a ball-joint, angularly free connector 16 is affixed to pedal arm 12, thereby providing a self centering connection for threaded push-rod 18. Pedal arm 12 is shown in the depressed position, at the extreme of travel during clutch operation. Push-rod 18 extends through opening 20 in firewall reinforcing plate 22, placed on the driver side of firewall 14. In this case, opening 20 is a slot, configured to clear push-rod 18 throughout its range of motion. Threaded push-rod 18 has a pair of jam nuts, providing adjustable stop 24, to bear on the periphery of opening 20 and to limit fluid displacement by master cylinder 42. Firewall 14 includes a clearance opening 28 for passage of push-rod 18. It is notable that the effective line-of-action 12A for push-rod 18 is tangent to the arc described by movement of connector 16 as pedal arm 12 moves to actuate clutch release.

The base portion 21 of mounting bracket 26 is connected to reinforcing plate 22 by bolts, sandwiching firewall 14 therebetween so as to stabilize the relatively thin firewall metal. Mounting bracket 26 has opposed members 23 in a "U" configuration with a pair of holes 28 defining horizontal pivot axis 30 as well as an opening in base portion 21 for passage of push-rod 18. Cylinder bracket 34 has arms on each side, with mounting holes 36 for bolted, pivotal engagement with holes 28 of mounting bracket 26 and a central portion having a 1.40" pilot diameter 38 and 0.31" diameter bolt holes 40, essentially conforming to the SAE standard mounting dimensions for hydraulic master cylinder 42.

Master cylinder 42, with axially displaceable piston and push-rod 18 for displacement thereof, is mounted on cylinder bracket 34 with bolted connectors 44 and cylinder bracket 34 is pivotally connected to mounting bracket 26 at pivotal axis 30 by means of bolted connectors 46. Fluid line 64 supplies hydraulic fluid from an unshown reservoir to master cylinder 42 and line 66 conducts hydraulic fluid under pressure to the unshown slave cylinder for releasing the clutch. The position of master cylinder 42 is adjusted about pivot axis 30 and locked in place by tightening bolted connections 46, so that push-rod 18 is closely aligned with the line-of-action 12A of pedal arm 12. Notably, with proper positioning of master cylinder 42, line-of-action 12A virtually intersects pivot axis 30 and there is little or no moment arm for clutch working forces to cause unwanted repositioning.

There are other factors to be considered insofar as locking master cylinder 42 in position. The inertia of its overhung weight will create a significant repositioning force with the road shock incurred driving over bumps, potholes and the like. Then too, there are unintended forces which may occur during engine work or in making a battery change. For this reason, enhanced locking means may be provided to secure the selected angular orientation of cylinder 42, such as shown here in arcuate slot 48 and mating bolt hole 50. Bolt, nut and lock washer set 52, applied through hole 50 and arcuate slot 48 and tightened, lock cylinder bracket 34 to mounting bracket 26 securely so as to resist random forces. Although arcuate slot 48 is shown on only one side of cylinder bracket 34, another could be provided on the opposite side also.

Figure 7:
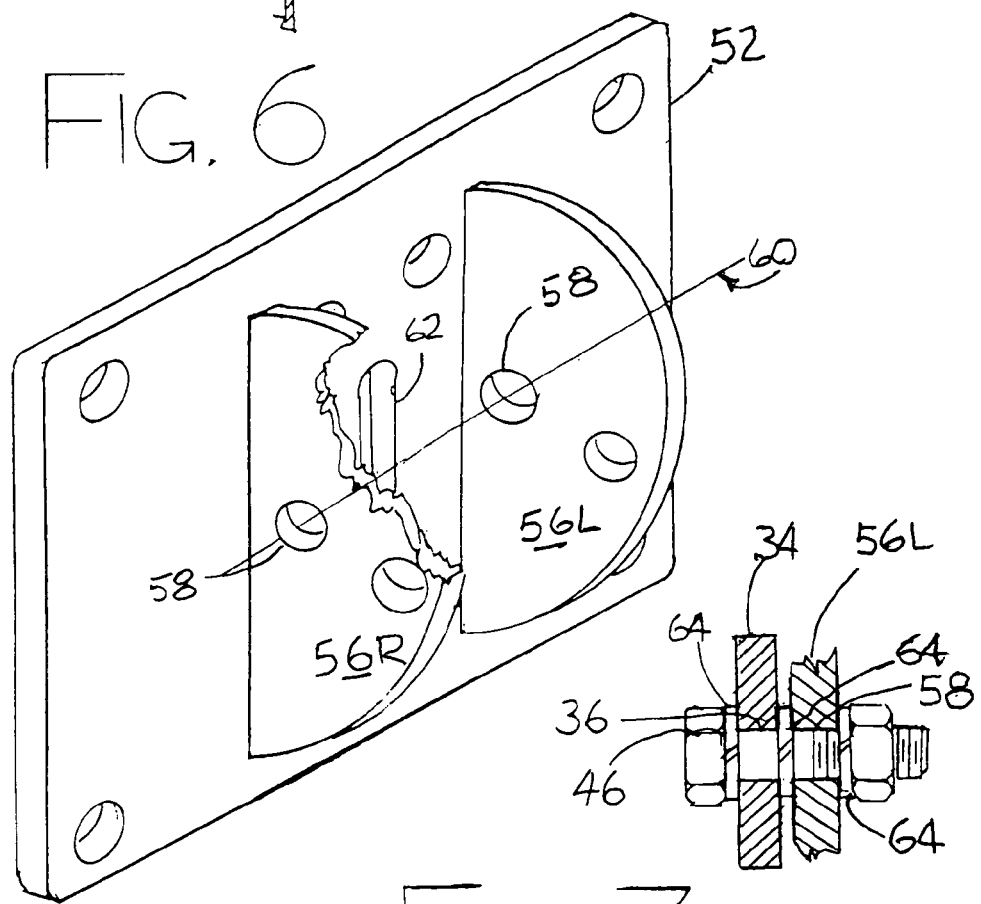
FIG. 7 is a partial cross-section view of a means for locking the brackets of either preferred embodiment in a selected relative position.

The above being said, an alternative locking means for securing cylinder bracket 34 in position is shown in the section view of FIG. 7, wherein lock washers 64 placed at both sides of mounting holes 36 of cylinder bracket 34 and holes 58 of mounting bracket arms 56R and 56L, and clamped by tightening bolted connectors 46, will lock master cylinder 42 securely in position, preventing relative movement in both clockwise and counter-clockwise directions. LOCTITE™ is a locking compound well known to those skilled in the mechanical arts that, when applied to the surfaces of cylinder bracket 34 and mounting bracket 26 where they contact, in the absence of lock washers 64, will also serve to lock master cylinder 42 securely in position.

Figure 5:
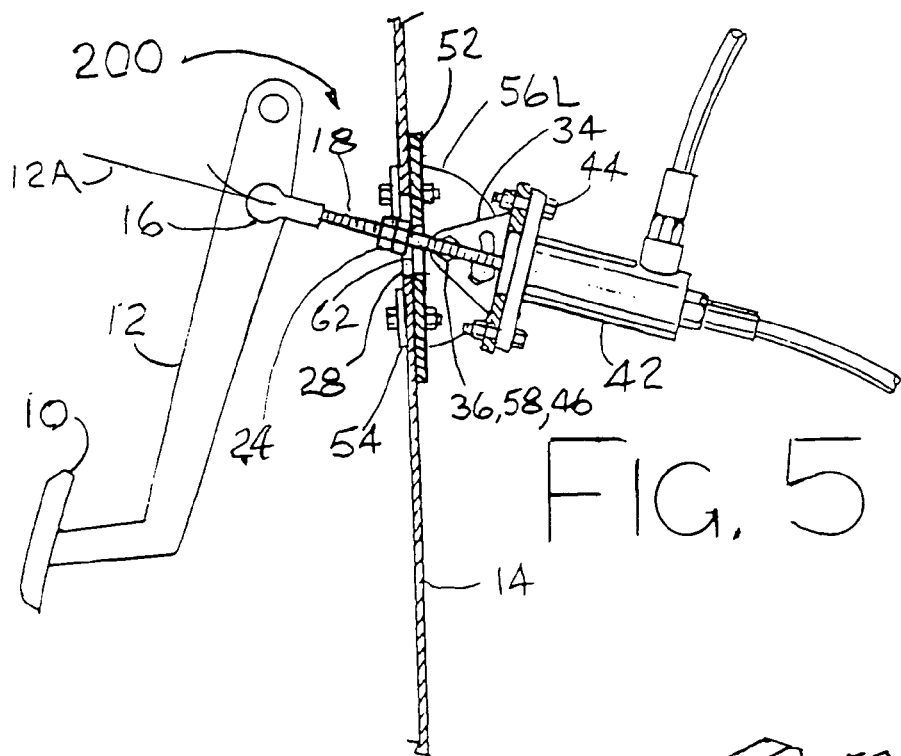
FIG. 5 is a section view of an installation of a second preferred embodiment of the adaptor of the present inventions.
Figure 6:
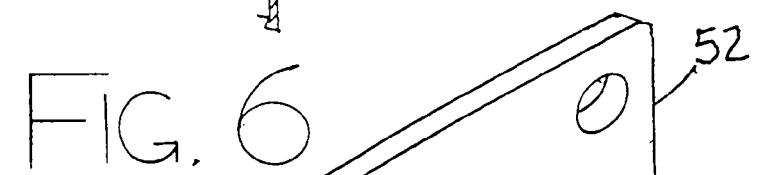
FIG. 6 is a view of the reinforcing plate of FIG. 5.

A second preferred embodiment 200 of the present invention is shown in FIGS. 5 and 6, wherein reinforcing bracket 52 combines the functions of reinforcing plate 22 and mounting bracket 26 in a single part. The clutch pedal 10/pedal arm 12 assembly is again shown to be already in place.

Pedal arm 12 is mounted for pivotal movement in relation to firewall 14 and angularly free connector 16 is affixed to pedal arm 12 as in embodiment 100. Pedal arm 12 is again shown in the depressed position, at the extreme of travel during clutch operation. Here, reinforcing bracket 52 is seen to cover an area larger than did reinforcing plate 22 and is bolted onto the engine side of firewall 14. Fender washers 54, placed under the bolt heads on the driver's side of firewall 14 prevent local deformation of the relatively thin firewall sheet metal.

Reinforcing bracket 52 includes extending arm members 56R and 56L with holes 58 defining pivotal axis 60 as well as an opening, shown as slot 62 in this embodiment, for passage of push-rod 18. Cylinder bracket 34 has mounting holes 36 for bolted engagement with holes 58 of reinforcing plate 52 and is configured to conform to the SAE standard mounting dimensions for hydraulic master cylinder 42.

Push-rod 18 extends through clearance opening 28 in firewall 14 and through opening or slot 62 in reinforcing bracket 52. Again, slot 62 is made to clear push-rod 18 throughout its range of motion and push-rod 18 has a pair of jam nuts, which provide adjustable stop 24 for limiting its stroke by bearing on the periphery of opening or slot 62. It is notable that the effective line-of-action 12A for push-rod 18 is tangent to the arc described by movement of connector 16 and aligned with the axis of master cylinder 42 as clutch release is actuated.

As in embodiment 100, master cylinder 42, with push-rod 18, is mounted on cylinder bracket 34 with bolted connectors 44. Cylinder bracket 34 is pivotally connected to reinforcing plate 52 at pivot axis 60 by means of bolted connectors 46.

The position of master cylinder 42 is adjusted about pivot axis 60 so that push-rod 18 is concentric and closely aligned with the axis of master cylinder 42.

The embodiments shown and described above are exemplary. It is not claimed that all of the details, parts, elements, or steps described and shown were invented herein. Even though many characteristics and advantages of the present inventions have been described in the drawings and accompanying text, the description is illustrative only. Changes may be made in the detail, especially in matters of shape, size, and arrangement of the parts within the scope and principles of the inventions. The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. A universal mounting apparatus for installing an SAE standard hydraulic clutch master cylinder on an automobile firewall, wherein a pedal arm is mounted for movement of a connection point along an arcuate path toward the firewall, so as to define a line-of-action comprising:
    the cylinder having an axis and a piston displaceable along the axis, with a threaded push-rod for displacement of the piston, the push-rod having a distal end;
    a cylinder bracket having SAE standard dimensioned installation provisions for the cylinder and providing for pivotal connection of the cylinder bracket about a pivotal axis perpendicular to the cylinder axis;
    a firewall reinforcing plate, including bolting holes for attachment thereto to the automobile firewall and an opening for allowing the threaded push-rod distal end to extend therethrough;
    a mounting bracket, with arms configured to provide the aforesaid pivotal axis, for connecting the cylinder bracket to the reinforcing plate at a selected angular orientation of the cylinder about the pivotal axis, with the push-rod distal end extending through the opening;
    an angularly free connector for connecting the push-rod distal end at the pedal arm connection point; and
    means for locking the selected angular orientation so that the cylinder axis is closely aligned with the line-of-action.

2. The universal mounting apparatus for installing an SAE standard hydraulic clutch master cylinder according to claim 1 and further comprising;
    a adjustable stop threaded onto the push rod so as to bear on the periphery of the opening and thereby limit displacement of the master cylinder piston.

3. The universal mounting apparatus for installing an SAE standard hydraulic clutch master cylinder according to claim 1 wherein;
    the mounting bracket includes a base portion having the arms extending on each side in a "U" configuration, the base portion including an opening and bolting holes, matching the reinforcing plate, for attachment thereto and sandwiching the firewall therebetween, the arms further being configured to provide an essentially horizontal pivotal axis when installed.

4. The universal mounting apparatus for installing an SAE standard hydraulic clutch master cylinder according to claim 1 wherein;
    the mounting bracket arms are a pair of opposed members extending on either side of the opening and configured to provide an essentially horizontal pivotal axis when installed.

5. The universal mounting apparatus for installing an SAE standard hydraulic clutch master cylinder according to claim 1 wherein the locking means comprises;
    mounting bracket bolt receiving holes located at the pivotal axis;
    matching cylinder bracket bolt receiving holes located at the pivotal axis; and
    tightenable bolts passing through each pair of matching mounting bracket and cylinder bracket holes.

6. The universal mounting apparatus for installing an SAE standard hydraulic clutch master cylinder according to claim 5 wherein the locking means further comprises a locking compound applied to contacting surfaces of the mounting bracket and the cylinder bracket.

7. The universal mounting apparatus for installing an SAE standard hydraulic clutch master cylinder according to claim 1 wherein the locking means comprises;
    a mounting bracket pivot hole located at the pivotal axis;
    a matching cylinder bracket pivot hole and a connector passing through the matching holes;
    an arcuate slot about the cylinder bracket pivot hole; and
    a bolt receiving hole aligned with the arcuate slot, with a tightenable bolt passing through the bolt hole and arcuate slot.

8. The universal mounting apparatus for installing an SAE standard hydraulic clutch master cylinder according to claim 1 wherein the locking means comprises;
    a mounting bracket bolt receiving hole located at the pivotal axis;
    a matching bolt receiving hole located on the cylinder bracket; and
    lock washers at both sides of each bolt receiving hole, with a tightenable bolt passing through the holes and lockwashers.

9. A universal mounting apparatus for installing an SAE standard hydraulic clutch master cylinder, having a threaded push-rod, on an automobile firewall having a driver side and an engine side, comprising:
    a firewall reinforcing plate, including bolting holes for attachment thereto to the automobile firewall on the driver side and having a opening therein to pass the threaded push-rod;
    a mounting bracket with a base portion having opposed arms extending on each side in a "U" configuration, the base portion including bolting holes and an opening matching the bolting holes and opening of the reinforcing plate, for attachment thereto and sandwiching the firewall therebetween, the arms further being configured to provide an essentially horizontal pivotal axis when installed;
    a cylinder bracket having a central portion with arms extending on each side, configured for pivotal engagement with the opposed arms of the mounting bracket, with the central portion including mounting holes for the SAE standard hydraulic clutch master cylinder; and
    means for locking the cylinder bracket at a selected angle about the pivotal axis.

10. The universal mounting apparatus for installing an SAE standard hydraulic clutch master cylinder according to claim 9 and further comprising;
   an adjustable stop threaded onto the push rod so as to bear on the periphery of the opening of the reinforcing plate and thereby limit displacement of the master cylinder piston.

11. The universal mounting apparatus for installing an SAE standard hydraulic clutch master cylinder according to claim 9 wherein the locking means comprises;
   mounting bracket bolt receiving holes located at the pivotal axis;
   matching cylinder bracket bolt receiving holes located at the pivotal axis; and
   tightenable bolts passing through each pair of matching mounting bracket and cylinder bracket holes.

12. The universal mounting apparatus for installing an SAE standard hydraulic clutch master cylinder according to claim 11 wherein the locking means further comprises a locking compound applied to contacting surfaces of the mounting bracket and the cylinder bracket.

13. The universal mounting apparatus for installing an SAE standard hydraulic clutch master cylinder according to claim 9 wherein the locking means comprises;
   a mounting bracket pivot hole located at the pivotal axis;
   a matching cylinder bracket pivot hole and a connector passing through the matching holes;
   an arcuate slot about the cylinder bracket pivot hole; and
   a bolt receiving hole aligned with the arcuate slot, with a tightenable bolt passing through the bolt hole and arcuate slot.

14. The universal mounting apparatus for installing an SAE standard hydraulic clutch master cylinder according to claim 9 wherein the locking means comprises;
   a mounting bracket bolt receiving hole located at the pivotal axis;
   a matching bolt receiving hole located on the cylinder bracket; and
   lock washers at both sides of each bolt receiving hole, with a tightenable bolt passing through the holes and lockwashers.

15. A universal mounting apparatus for installing an SAE standard hydraulic clutch master cylinder, having a threaded push-rod, on an automobile firewall having a driver side and an engine side, comprising:
   a firewall reinforcing plate, including bolting holes for attachment thereof to the automobile firewall on the engine side, having a opening therein to pass the threaded push-rod and having opposed mounting bracket arms extending on each side of the opening to provide for an essentially horizontal pivotal axis when installed;
   a cylinder bracket with a central portion having arms extending on each side, configured for pivotal engagement with the opposed mounting bracket arms, the central portion including mounting holes for the SAE standard hydraulic clutch master cylinder; and
   means for locking the cylinder bracket at a selected angle about the pivotal axis.

16. The universal mounting apparatus for installing an SAE standard hydraulic clutch master cylinder according to claim 15 and further comprising;
   an adjustable stop threaded onto the push rod so as to bear on the periphery of the opening and thereby limit displacement of the master cylinder piston.

17. The universal mounting apparatus for installing an SAE standard hydraulic clutch master cylinder according to claim 15 wherein the locking means comprises;
   mounting bracket bolt receiving holes located at the pivotal axis;
   matching cylinder bracket bolt receiving holes located at the pivotal axis; and
   tightenable bolts passing through each pair of matching mounting bracket and cylinder bracket holes.

18. The universal mounting apparatus for installing an SAE standard hydraulic clutch master cylinder according to claim 15 wherein the locking means comprises;
   a mounting bracket pivot hole located at the pivotal axis;
   a matching cylinder bracket pivot hole and a connector passing through the matching holes;
   an arcuate slot about the cylinder bracket pivot hole; and
   a bolt receiving hole aligned with the arcuate slot, with a tightenable bolt passing through the bolt hole and arcuate slot.

19. The universal mounting apparatus for installing an SAE standard hydraulic clutch master cylinder according to claim 15 wherein the locking means comprises;
   a mounting bracket bolt receiving hole located at the pivotal axis;
   a matching bolt receiving hole located on the cylinder bracket; and
   lock washers at both sides of each bolt receiving hole, with a tightenable bolt passing through the holes and lockwashers.

20. A method for installing an SAE standard hydraulic clutch master cylinder, with a threaded push-rod on an automobile firewall, wherein a pedal arm is mounted for movement toward the firewall, comprising the steps of:
   bolting a reinforcing plate to the firewall;
   mounting the clutch master cylinder on a pivotable bracket;
   connecting the bracket to the reinforcing plate, so that the push-rod extends through the bracket and firewall;
   connecting the push-rod to the pedal arm;
   adjusting the angle of the pivotable bracket to reinforcing plate connection, so that the push-rod is aligned with the cylinder;
   locking the pivotable bracket angle to prevent relative movement; and
   providing an adjustable stop on the threaded push-rod to bear against the reinforcing plate, so as to limit movement of the pedal arm toward the firewall.

* * * * *